June 1, 1926.  E. D. TILLYER  1,587,131

OPHTHALMIC MOUNTING

Filed Feb. 1, 1926

Inventor
Edgar D. Tillyer.
By Harry H. Styll.
Attorney

Patented June 1, 1926.

1,587,131

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed February 1, 1926. Serial No. 85,247.

This invention relates to improvements in ophthalmic mountings and has particular reference to a protection mounting wherein the prescription lens is protected and shielded by an additional protection lens.

The principal object of this invention is to provide simple, efficient and inexpensive means by which a prescription lens may be held in a protection mounting having a protection non-prescription lens.

Another object of the invention is to provide means for holding a prescription lens which may be simply put in place in a protection mounting having a non-prescription protection lens.

Another object of the invention is to provide simple means for putting in and taking out a prescription lens in a mounting having a protection non-prescription lens.

Another object of the invention is to provide means whereby the non-prescription lens will hold and retain in place the means for holding the prescription lens used in conjunction therewith.

Other objects and advantages of the invention should become apparent from the following description taken in connection with the accompanying drawings, the preferred form only being shown by way of illustration.

It is apparent that many modifications of the detailed construction and arrangement of parts may be made without departing from the spirit of the invention as expresed in the accompanying claims, and I, therefore, do not wish to be limited to the devices shown and described.

Referring to the drawings wherein similar characters designate corresponding parts throughout:

Figure 1:
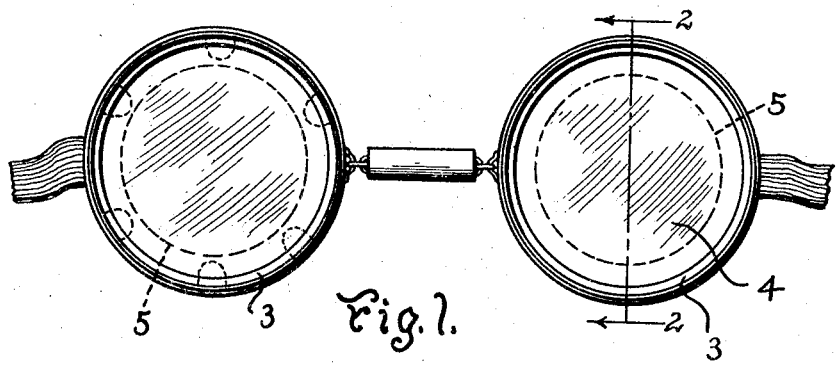
Figure 1 is a front view of a mounting embodying the invention.

Prior to my invention protection glasses have been used in conjunction with the ordinary prescription lenses, but it has been a difficult and expensive matter to provide means for holding a prescription lens wherein the same was ready of access and could be put in place or removed readily in case it were broken.

In my invention I have provided simple and inexpensive means for holding the prescription lens in the protection mounting whereby the prescription lens may be readily and easily inserted and readily and easily replaced when broken.

The lens rim 1 of the protection mounting has a lens seat 2 and a flared lip 3, and is made of resilient material, such as thin resilient metal or resilient composition or fiber material. The protection lens 4 which is ordinarily a flat lens without power curves thereon, is inserted in the lens groove 2 by pushing it against the flared ends 3 of the rim 1. These flared ends act as cams and force outwardly the rim 1 until the lens enters on the seat 2. The lens may be removed by pressing in the opposite direction forcing out the resilient ends of the lens rim 1. My prescription lens 5 is inserted in a frame 6 which is held together by the end piece 7 and screw 8. This lens rim 6 has a flared inclined portion 9 angled to sit on one side of the inclined face of the lens seat 2.

Figure 2:
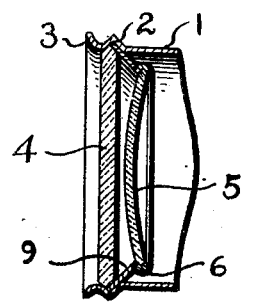
Figure 2 is a cross section on line 2—2 of Figure 1.
Figure 3:
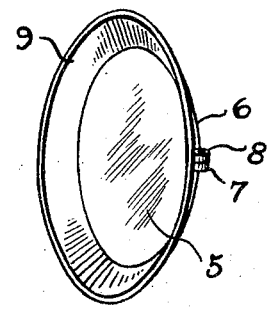
Figure 3 is a perspective view of the frame for holding a prescription lens.
Figure 4:
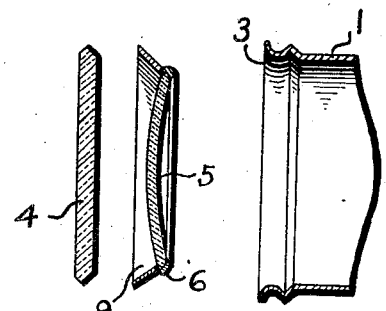
Figure 4 is a view similar to Figure 2 wherein the various parts of the mounting are shown in separated position.

To assemble my protection mounting I first place the lens 5 in the frame 6, bringing the end pieces 7 together and securing them there by the screw 8. I then place a flared portion 9 of the frame 6 in the lens seat 2 of the lens as shown in Figure 2, and then press my protection lens 4 against the flared portion of the frame 1, thus springing it out and allowing the lens 4 to seat itself on the lens seat 2 on top of the flared portion 9 of the frame 6. To separate the parts I press outwardly on the flared portions 3 of the rim 1 until the lens 4 is free. By inverting the frame 1 the lens 4 will drop out and likewise the frame 6 holding the prescription lens 5. In cases where the prescription lens 5 has been broken I may remove the lens 4 by pressing on it from the inside, forcing it out through the cam action of its bevel face on the cam portions of the groove of the frame 1, removing at the same time the frame 6 for holding the prescription lens 5.

Instead of making the portion 3 of the frame 1 resilient and springy it may be made of ductile material bent down over the lens 4 after the same is in place. To remove the lens 4 and the lens 5 from this construction it will be necessary to force up the portion 3 out of the way of the edge of the lens allowing the removal. Instead of making the portion 3 a complete flange all around the periphery of the rim 1, I may make the portion 3 in the form of clips at separated spaces around the periphery of the rim 1, and these clips being of ductile material are easily bent out of place to take out the lens 4 or 5. The clips are indicated in dotted lines in Figure 1 by the numeral 10.

It will be apparent from the foregoing description that I have provided simple, inexpensive and efficient means for carrying out the objects and uses of this invention, particularly ready means of access for inserting and removing the prescription lens.

Having described my invention, I claim:

1. In a device of the character described, a lens rim having a lens groove with inclined walls, the center of the groove being lower than the edges of the groove, and a second lens rim having an inclined portion shaped to rest on one side of the lens groove in the first rim and to be retained thereon by the lens held in the lens groove of the first rim.

2. In a device of the character described, an elastic lens rim having a lens groove with inclined walls, the center of the groove being lower than the edges of the groove, and a second lens rim having an inclined portion shaped to rest on one face of the lens groove in the first rim being held in place thereon by the lens snapped into the groove of the first rim by pressure, the outer portion of the groove in the first rim acting as a cam face to spring the groove to enter the lens and an inner portion of the groove acting as a cam face to spring the groove to take the lens out in the opposite direction.

3. In a device of the character described, a lens rim having a lens groove, a second lens rim having an inclined portion resting in the lens groove of the first rim, a lens in the second lens rim, and a lens in the groove of the first lens rim holding the inclined portion of the second rim in place in the groove of the first lens rim.

4. In a device of the character described, a lens rim having a lens groove, a second lens rim having a lens groove and an inclined portion resting in the groove of the first rim, a lens in the groove of the second rim, and a lens in the groove of the first rim holding in place the inclined portion of the second rim in the lens groove of the first rim.

5. In a device of the character described, a lens rim having a lens groove, a second lens rim comprising a split ring having a lens groove and an inclined portion resting in the lens groove of the first rim, a lens in the groove of the second rim, means for securing the split ring together, and a lens in the groove of the first rim holding the inclined portion of the second rim in place in the groove in the first rim.

EDGAR D. TILLYER.